United States Patent
Oura

(10) Patent No.: US 9,013,565 B2
(45) Date of Patent: Apr. 21, 2015

(54) IMAGE DISPLAY SYSTEM, IMAGE DISPLAY APPARATUS AND SHUTTER DEVICE

(75) Inventor: Masafumi Oura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 378 days.

(21) Appl. No.: 13/445,383

(22) Filed: Apr. 12, 2012

(65) Prior Publication Data

US 2012/0268577 A1    Oct. 25, 2012

(30) Foreign Application Priority Data

Apr. 22, 2011  (JP) ................................. 2011-095864

(51) Int. Cl.
  *H04N 13/04*    (2006.01)
  *G02B 27/22*    (2006.01)

(52) U.S. Cl.
  CPC ........ *G02B 27/2264* (2013.01); *H04N 13/0438* (2013.01); *H04N 13/0497* (2013.01)

(58) Field of Classification Search
  CPC ........... G02B 27/2264; H04N 13/0497; H04N 13/0438
  USPC .......................................................... 348/56
  See application file for complete search history.

(56) References Cited

U.S. PATENT DOCUMENTS

| 2010/0003355 | A1 | 1/2010 | Murdock et al. | |
| 2011/0205347 | A1* | 8/2011 | MacNaughton et al. | 348/56 |
| 2011/0227909 | A1* | 9/2011 | Hayes et al. | 345/419 |
| 2011/0228046 | A1* | 9/2011 | Arling et al. | 348/42 |
| 2011/0242293 | A1* | 10/2011 | Kikuchi et al. | 348/51 |
| 2011/0249103 | A1* | 10/2011 | Taniguchi | 348/56 |
| 2011/0316847 | A1* | 12/2011 | Cheng | 345/419 |
| 2012/0062562 | A1* | 3/2012 | Chen et al. | 345/419 |
| 2012/0147160 | A1* | 6/2012 | Tabor | 348/56 |
| 2013/0027526 | A1* | 1/2013 | Mao | 348/56 |
| 2013/0063557 | A1* | 3/2013 | Saigo et al. | 348/42 |

FOREIGN PATENT DOCUMENTS

| CN | 1244088 A | 2/2000 |
| CN | 101977331 A | 2/2011 |
| JP | 03-276246 A | 12/1991 |
| JP | A-11-127457 | 5/1999 |
| JP | A-2004-130026 | 4/2004 |
| JP | 2006-005929 A | 1/2006 |
| JP | 2009-134497 A | 6/2009 |
| JP | A-2009-531979 | 9/2009 |
| JP | A-2009-302770 | 12/2009 |

(Continued)

*Primary Examiner* — Jay Patel
*Assistant Examiner* — Francis G Geroleo
(74) *Attorney, Agent, or Firm* — Oliff PLC

(57) ABSTRACT

An image display system includes an image display apparatus and a shutter device. The image display apparatus includes an image display section, a sync signal sending section which sends a sync signal for synchronizing display timings of the left-eye image and the right-eye image with the shutter device to the shutter device, and a protocol sending section which sends protocol information to the shutter device. The shutter device include a shutter section which transmits the left-eye image and the right-eye image, a shutter drive section which analyzes the sync signal received through a sync signal receiving section using the protocol information stored in a protocol storing section and drives the shutter section on the basis of the analysis result, and a protocol updating section which updates the protocol information stored in the protocol storing section.

6 Claims, 9 Drawing Sheets

(56) References Cited

FOREIGN PATENT DOCUMENTS

| JP | 2010-062767 A | 3/2010 |
| JP | A-2010-61105 | 3/2010 |
| TW | M398128 U1 | 2/2011 |
| WO | WO 2007/126904 A2 | 11/2007 |

* cited by examiner

IMAGE DISPLAY SYSTEM, IMAGE DISPLAY APPARATUS AND SHUTTER DEVICE

The entire disclosure of Japanese Patent Application No. 2011-095864 filed Apr. 22, 2011 is expressly incorporated by reference herein.

BACKGROUND

1. Technical Field

The present invention relates to an image display system, an image display apparatus, shutter device and an image display method.

2. Related Art

In the related art, a system has been proposed which includes an image output apparatus which outputs a 3D image formed by a left-eye image and a right-eye image, and 3D glasses(shutter device) which are used to view the 3D image output from the image output apparatus (for example, refer to JP-A-2010-61105). In such a system, the 3D glasses include left and right shutters which are driven so as to alternately transmit the left-eye image and the right-eye image (alternately transmit or block light with respect to the left and right eyes), analyze a sync signal received from the outside according to a protocol stored in the 3D glasses, generate a shutter drive signal on the basis of the analysis result, and drive the shutters.

However, at present, a plurality of sync signals of different formats based on a plurality of protocols has been used, and the sync signal of each format cannot be analyzed without a protocol corresponding to the sync signal. Thus, for each of output apparatuses (for example, image output apparatuses) which output sync signals of different formats, it is necessary to use 3D glasses corresponding to the protocol for analyzing the sync signal of each format.

Thus, a cost increase is caused to a user who views a 3D image. For example, in purchasing a new output apparatus, even though a user already has 3D glasses, if the 3D glasses do not correspond to the newly purchased output apparatus, the user should purchase 3D glasses corresponding to the newly purchased output apparatus, which causes a cost increase.

SUMMARY

An advantage of some aspects of the invention is to provide a technique which reduces the cost burden to a user.

An aspect of the invention is directed to an image display system including an image display apparatus which displays a 3D image including a left-eye image and a right-eye image and a shutter device which are used to view the 3D image. Here, the image display apparatus includes: an image display section which displays the 3D image; a sync signal sending section which sends a sync signal for synchronizing display timings of the left-eye image and the right-eye image of the 3D image displayed on the image display section with the shutter device to the shutter device; and a protocol sending section which sends protocol information, which is information about a protocol used for analysis of the sync signal, to the shutter device. Further, the shutter device include: a shutter section which transmits the left-eye image and the right-eye image of the 3D image; a protocol storing section which stores the protocol information; a sync signal receiving section which receives the sync signal; a shutter drive section which analyzes the sync signal received through the sync signal receiving section using the protocol information stored in the protocol storing section and drives the shutter section on the basis of the analysis result; a protocol receiving section which receives the protocol information; and a protocol updating section which updates the protocol information stored in the protocol storing section into new protocol information received through the protocol receiving section.

According to this configuration, even though a user does not newly purchase 3D glasses of a different protocol, it is possible to simply change (update) a protocol of the existing 3D glasses into the different protocol. That is, it is possible to reduce the cost burden (cost for purchasing 3D glasses) to a user with little work burden. Further, in a case where a unified protocol appears in the future, it is possible to simply change the existing protocol into the unified protocol through an image display apparatus, and thus, it is not necessary to purchase 3D glasses based on the unified protocol, which lessens the burden.

In the image display system as described above, the image display apparatus may further include: a protocol ID requesting section which requests the shutter device to send a protocol ID for identifying the protocol stored in the protocol storing section of the shutter device as the protocol information; and a transmission necessity determining section which determines whether transmission of the protocol information is necessary on the basis of the protocol ID received from the shutter device according to the transmission request of the protocol ID requesting section.

According to this configuration, it is possible to perform a change process for only 3D glasses in which its protocol should be changed.

In the image display system as described above, the image display apparatus may further include a protocol saving section which stores the protocol information to save the protocol information, the protocol sending section may receive the protocol information stored in the shutter device, and the protocol saving section may store the protocol information received from the shutter device through the protocol sending section.

According to this configuration, it is possible to return the protocol information of the 3D glasses to its original state, as necessary.

In the image display system as described above, the image display apparatus may further include: a device ID requesting section which requests the shutter device to send a device ID for identifying the shutter device; a correction necessity determining section which determines whether correction of a delay value from the time when the sync signal is received to the time when the shutter section is driven, in the shutter device, is necessary on the basis of the device ID received from the shutter device according to the transmission request of the device ID requesting section, and determines a correction amount of the delay value; and a correction information sending section which sends correction information indicating the correction amount determined by the correction necessity determining section to the shutter device, and the shutter device may further include: a correction information receiving section which receives the correction information; and a delay value correcting section which corrects the delay value on the basis of the correction information received through the correction information receiving section.

According to this configuration, it is possible to correct the delay value of the 3D glasses, as necessary.

Another aspect of the invention is directed to an image display apparatus including: an image display section which displays a 3D image including a left-eye image and a right-eye image; a sync signal sending section which sends a sync signal to shutter device which transmit the left-eye image and the right-eye image; and a protocol sending section which sends protocol information, which is information about a protocol used when the shutter device analyze the sync signal, to the shutter device.

According to this configuration, it is possible to achieve the above-described effects.

Still another aspect of the invention is directed to shutter device which are used to view a 3D image including a left-eye image and a right-eye image, including: a shutter section which transmits the left-eye image and the right-eye image of the 3D image; a sync signal receiving section which receives a sync signal for synchronizing display timings of the left-eye image and the right-eye image of the 3D image with driving of the shutter section; a protocol storing section which stores protocol information which is information about a protocol used for analysis of the sync signal; a shutter drive section which analyzes the sync signal received through the sync signal receiving section using the protocol information stored in the protocol storing section and drives the shutter section on the basis of the analysis result; a protocol receiving section which receives the protocol information; and a protocol updating section which updates the protocol information stored in the protocol storing section into new protocol information received through the protocol receiving section.

According to this configuration, it is possible to achieve the above-described effects.

Yet another aspect of the invention is directed to an image display method in an image display system including an image display apparatus which displays a 3D image including a left-eye image and a right-eye image and a shutter device which include a shutter section which transmits the left-eye image and the right-eye image of the 3D image, the method including: displaying the 3D image, by an image display section of the image display apparatus; sending a sync signal for synchronizing display timings of the left-eye image and the right-eye, image of the 3D image displayed on the image display section with the shutter device to the shutter device, by a sync signal sending section of the image display apparatus; sending protocol information, which is information about a protocol used for analysis of the sync signal, to the shutter device, by a protocol sending section of the image display apparatus; storing the protocol information, by a protocol storing section of the shutter device; receiving the sync signal, by a sync signal receiving section of the shutter device; analyzing the sync signal received through the sync signal receiving section using the protocol information stored in the protocol storing section and driving the shutter section on the basis of the analysis result, by a shutter drive section of the shutter device; receiving the protocol information, by a protocol receiving section of the shutter device; and updating the protocol information stored in the protocol storing section into new protocol information received through the protocol receiving section, by a protocol updating section of the shutter device.

According to this configuration, it is possible to achieve the above-described effects.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
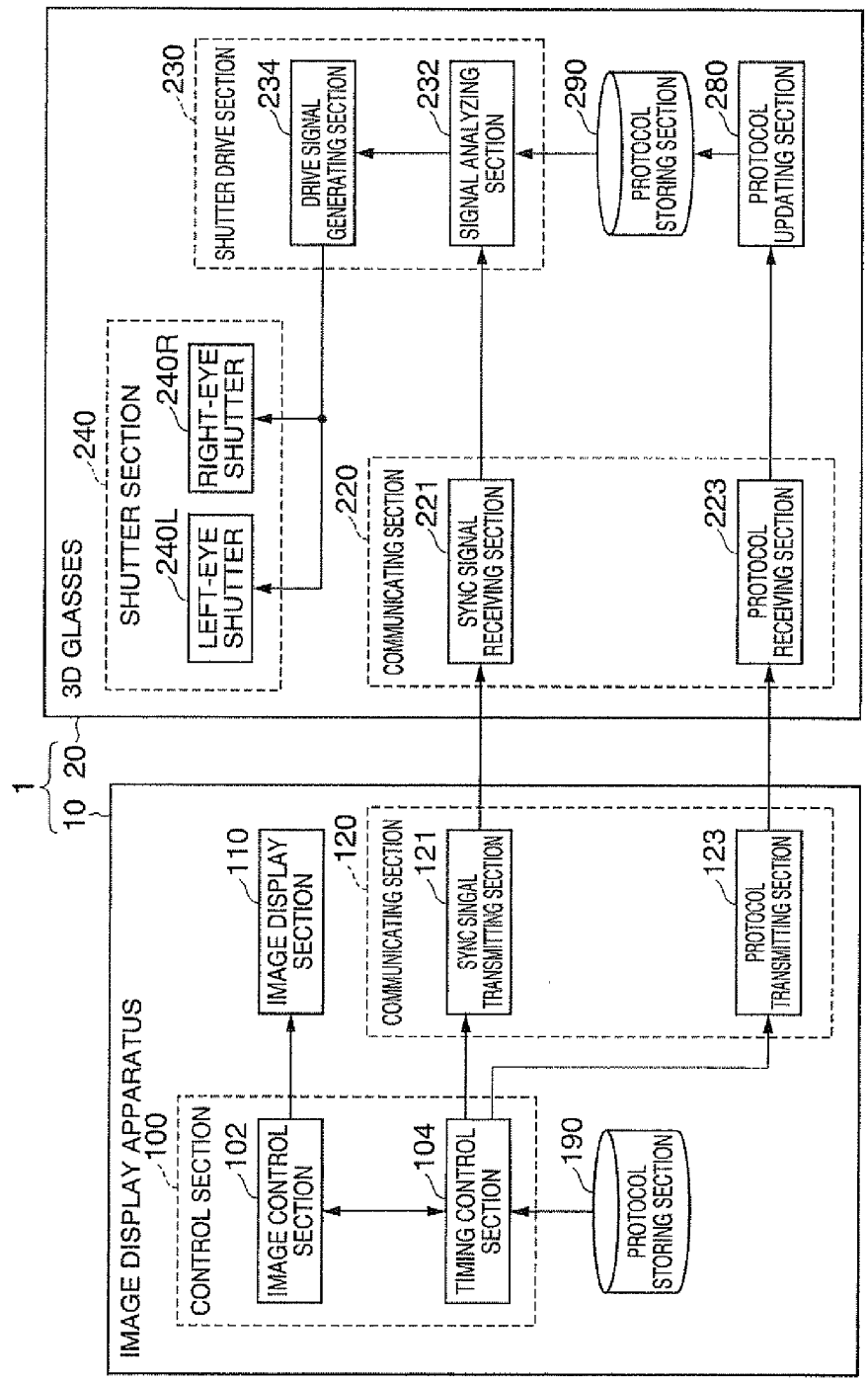
FIG. 1 is an example of a functional block diagram of an image display system according to a first embodiment of the invention.

Hereinafter, a first embodiment of the invention will be described in detail with reference to the accompanying drawings. FIG. 1 is an example of a functional block diagram of an image display system 1 according to the first embodiment of the invention.

As shown in FIG. 1, the image display system 1 includes an image display apparatus 10 which displays a 3D image including a left-eye image and a right-eye image, and 3D glasses (shutter device) 20 which are used for viewing the 3D image (image display systems 2, 3 and to be described later are also similar to the image display system 1). The image display apparatus 10 corresponds to a projector, a 3D TV, or the like, for example.

Image Display Apparatus 10

The image display apparatus 10 includes a control section 100, an image display section 110, a communicating section 120 and a protocol storing section 190. The control section 100 includes an image control section 102 and a timing control section 104. The communicating section 120 includes a sync signal sending section 121 and a protocol sending section 123.

The image control section 102 obtains (receives) a 3D image from the outside or the inside. For example, the image control section 102 obtains the 3D image from an external apparatus (for example, a personal computer or a server). Further, for example, in a case where the image display apparatus 10 includes an antenna section (not shown), the image control section 102 receives the 3D image from a broadcasting station (broadcast wave) through the antenna section. Further, for example, in a case where the image display apparatus 10 is provided with an image storing section (not shown) therein, the image control section 102 obtains the 3D image from the image storing section. The image control section 102 temporarily stores the obtained 3D image.

Further, the image control section 102 obtains a signal which synchronizes a display timing of the 3D image with the 3D glasses 20 (a signal which synchronizes display timings of the left-eye image and right-eye image with driving of a shutter section 240 (which will be described later). Hereinafter, this signal is referred to as a "sync signal").

For example, in a case where the 3D image is obtained from the outside (for example, a personal computer, a server or a broadcasting station), the image control section 102 obtains the sync signal through the timing control section 104. Further, in a case where the 3D image is obtained from the inside (for example, a built-in image storing section), the image control section 102 may directly obtain the sync signal from the inside (for example, a timing storing section (not shown) which stores the displayed timing of each 3D image) without through the timing control section 104. In a case where the image control section 102 obtains the sync signal without through the timing control section 104, the image control section 102 outputs the sync signal to the timing control section 104.

The image control section 102 which obtains the sync signal controls the display timing to match with the sync signal, to output the 3D image which is temporarily stored to the image display section 110.

The image display section 110 outputs the 3D image obtained from the image control section 102 to the outside. For example, in a case where the image display apparatus 10 is a projector, the image display section 110 projects the 3D image to a screen (not shown) which is installed in front of the image display apparatus 10. Further, in a case where the image display apparatus 10 is a 3D TV, the image display section 110 displays the 3D image on a display section (not shown) which is provided in the image display apparatus 10.

The protocol storing section 190 stores information about protocol referenced in analysis of the sync signal (sync protocol firmware, hereinafter, referred to as "protocol information").

The timing control section 104 obtains the sync signal from the outside (for example, a personal computer, a server, or a broadcasting station) or the image control section 102. In a case where the sync signal is obtained from the outside, the image control section 102 outputs the sync signal obtained from the outside to the image control section 102 and the sync signal sending section 121. Further, in a case where the sync signal is obtained from the image control section 102, the timing control section 104 outputs the sync signal obtained from the image control section 102 to the sync signal sending section 121.

The sync signal output to the sync signal sending section 121 is sent to the 3D glasses 20 by the sync signal sending section 121, and is used for generation of a shutter drive signal (which will be described later) in the 3D glasses 20.

That is, by sending the sync signal to the 3D glasses 20 through the sync signal sending section 121, the timing control section 104 controls the driving of a shutter section 240 in 3D glasses 20 (performs control so that the driving of the shutter section 240 is synchronized with the 3D image which is being displayed).

Further, the timing control section 104 outputs the protocol information which is stored in the protocol storing section 190 to the protocol sending section 123. For example, the timing control section 104 reads the protocol information which is stored in the protocol storing section 190 and outputs the result to the protocol sending section 123 (see FIG. 1). Further, for example, the timing control section 104 may obtain the protocol information from the image control section 102 and output the result to the protocol sending section 123. In a case where the timing control section 104 obtains the protocol information from the image control section 102, the protocol information which is stored in the protocol storing section 190 is read by the image control section 102 and is then output to the timing control section 104.

The timing control section 104 may output the protocol information to the protocol sending section 123 according to a user's instruction. For example, in a case where the timing control section 104 reads the protocol information from the protocol storing section 190 and outputs the result to the protocol sending section 123, when receiving an instruction for updating the protocol information from the user n through a operation receiving section (not shown), the timing control section 104 may read the protocol information and output the result to the protocol sending section 123. Further, for example, in a case where the timing control section 104 obtains the protocol information from the image control section 102 and outputs the result to the protocol sending section 123, when receiving the instruction for updating the protocol information from the user through the operation receiving section (not shown), the image control section 102 may read the protocol information and output the result to the timing control section 104.

The sync signal sending section 121 obtains the sync signal from the timing control section 104 and sends the obtained sync signal to the 3D glasses 20 through wireless communication. Here, the term "wireless communication" means communication which does not use a wire as a transmission path, such as infrared communication.

The protocol sending section 123 obtains the protocol information from the timing control section 104. The protocol sending section 123 which obtains the protocol information sends the obtained protocol information to the 3D glasses 20 through wireless communication or wired communication. Here, the term "wired communication" means communication which is performed using a transmission path such as a variety of cables.

3D Glasses 20

The 3D glasses 20 include a communicating section 220, a shutter drive section 230, a shutter section 240, a protocol updating section 280 and a protocol storing section 290. The communicating section 220 includes a sync signal receiving section 221 and a protocol receiving section 223. The shutter drive section 230 includes a signal analyzing section 232 and a drive signal generating section 234. The shutter section 240 includes a left-eye shutter 240L and a right-eye shutter 240R, each of which includes a liquid crystal panel.

The protocol storing section 290 stores the protocol information. One piece of protocol information is stored in the protocol storing section 290 when the 3D glasses 20 are manufactured (shipped).

The sync signal receiving section 221 receives the sync signal from the sync signal sending section 121 of the image display apparatus 10 through wireless communication. The sync signal receiving section 221 outputs the sync signal received from the sync signal sending section 121 to the signal analyzing section 232.

The signal analyzing section 232 obtains the sync signal through the sync signal receiving section 221. When obtaining the sync signal, the signal analyzing section 232 analyzes the sync signal using the protocol information which is stored in the protocol storing section 290. The signal analyzing section 232 outputs the analysis result of the sync signal to the drive signal generating section 234.

The drive signal generating section 234 obtains the analysis result of the sync signal from the signal analyzing section 232. When obtaining the analysis result of the sync signal, the drive signal generating section 234 generates a signal for driving the shutter section 240 (hereinafter, referred to as "shutter drive signal") on the basis of the analysis result. The drive signal generating section 234 outputs the shutter drive signal to the shutter section 240.

The left-eye shutter 240L of the shutter section 240 has a function of transmitting a left-eye image of a 3D image which is displayed in the image display apparatus (for example, a 3D image projected by a projector, or a 3D image displayed in a TV), and blocking a right-eye image thereof. On the other hand, the right-eye shutter 240R has a function of transmitting the right-eye image of the 3D image which is displayed in the image display apparatus, and blocking the left-eye image thereof.

The shutter section 240 obtains the shutter drive signal from the drive signal generating section. 234, and alternately drives the left-eye shutter 240L and the right-eye shutter 240R according to the shutter drive signal. Thus, in a case where the 3D image is viewed through the 3D glasses 20, the left-eye image and the right-eye image alternately pass through the left-eye shutter 240L and the right-eye shutter 240R to reach the left eye and the right eye of the user. Thus, the user can view the 3D image as intended.

The protocol receiving section 223 receives the protocol information from the protocol sending section 123 of the image display apparatus 10 through wireless communication or wired communication. The protocol receiving section 223 outputs the protocol information received from the protocol sending section 123 to the protocol updating section 280.

The protocol updating section 280 obtains the protocol information through the protocol receiving section 223. In a case where the protocol information is obtained through the protocol receiving section 223, the protocol updating section 280 updates the protocol information which is stored in the protocol storing section 290 into the protocol information which is obtained through the protocol receiving section 223. In a case where the protocol information which is stored in the protocol storing section 290 is updated, the signal analyzing section 232 analyzes the sync signal using the updated protocol information (new protocol information).

Figure 2:
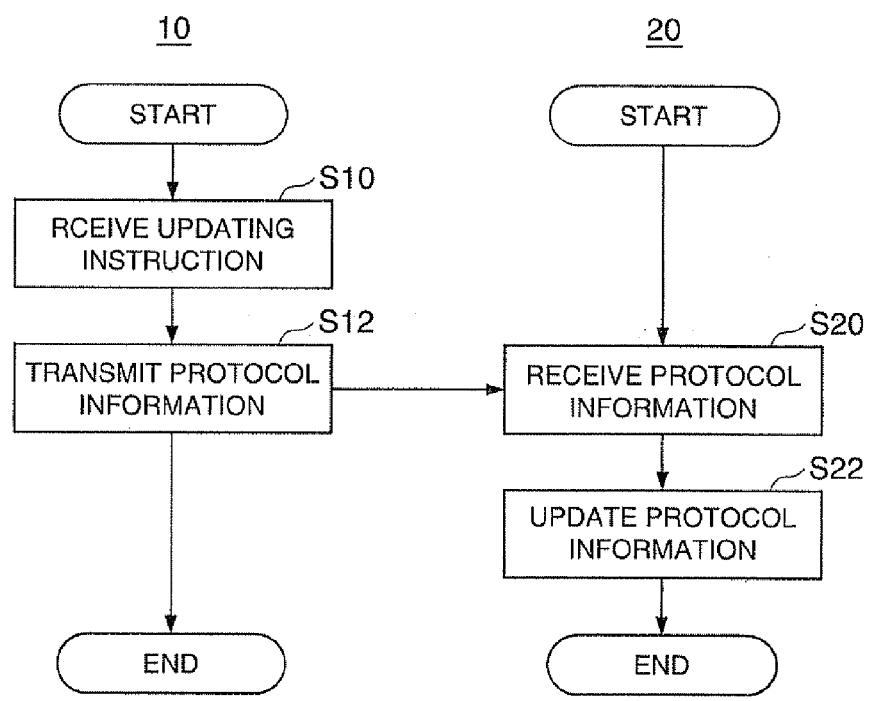
FIG. 2 is a flowchart illustrating an example of an operation of the image display system according to the first embodiment of the invention.

Hereinafter, an operation of the image display system 1 will be described with reference to FIG. 2. FIG. 2 is a flowchart illustrating an example of the operation of the image display system 1 according to the first embodiment of the invention. Specifically, the left side of the flowchart in FIG. 2 represents an operation of the image display apparatus 10 relating to updating of the protocol information, and the right side of the flowchart in FIG. 2 represents an operation of the 3D glasses 20 relating to updating of the protocol information.

The timing control section 104 of the image display apparatus 10 receives the updating instruction of the protocol information from the user through the operation receiving section (not shown) (step S10). The timing control section 104 which receives the updating instruction outputs the protocol information to the protocol sending section 123. Here, as described above, the image control section 102 may receive the updating instruction of the protocol information from the user through the operation receiving section (not shown) and output the protocol information to the timing control section 104, and the timing control section 104 may output this protocol information to the protocol sending section 123.

The protocol sending section 123 which obtains the protocol information sends the obtained protocol information to the 3D glasses 20 through wireless communication or wired communication (step S12). Then, the process of the image display apparatus 10 relating to updating of the protocol information ends.

On the other hand, the protocol receiving section 223 of the 3D glasses 20 receives the protocol information from the protocol sending section 123 of the image display apparatus 10 (step 820). The protocol receiving section 223 which receives the protocol information outputs the received protocol information to the protocol updating section 280.

The protocol updating section 280 which obtains the protocol information through the protocol receiving section 223 updates the protocol information which is stored in the protocol storing section 290 into the protocol information which is obtained through the protocol receiving section 223 (step 822). Then, the process of the 3D glasses 20 relating to updating of the protocol information ends.

The image display system 1 according to the first embodiment of the invention has been described above. According to the image display system 1, even though the user does not newly purchase 3D glasses of a different protocol, it is possible to simply change the protocol of the existing 3D glasses 20 to the different protocol (protocol which is stored in the protocol storing section 190 of the image display apparatus 10). That is, it is possible to reduce the cost burden to the user (purchase expense of the 3D glasses), with little work burden. Further, even in a case where protocols are unified in the future, it is possible to change the protocol to the unified protocol through the image display apparatus by storing the unified protocol in the protocol storing section 190 of the image display apparatus 10, and it is thus not necessary to purchase 3D glasses based on the unified protocol, which lessens the burden.

Second Embodiment

Figure 3:
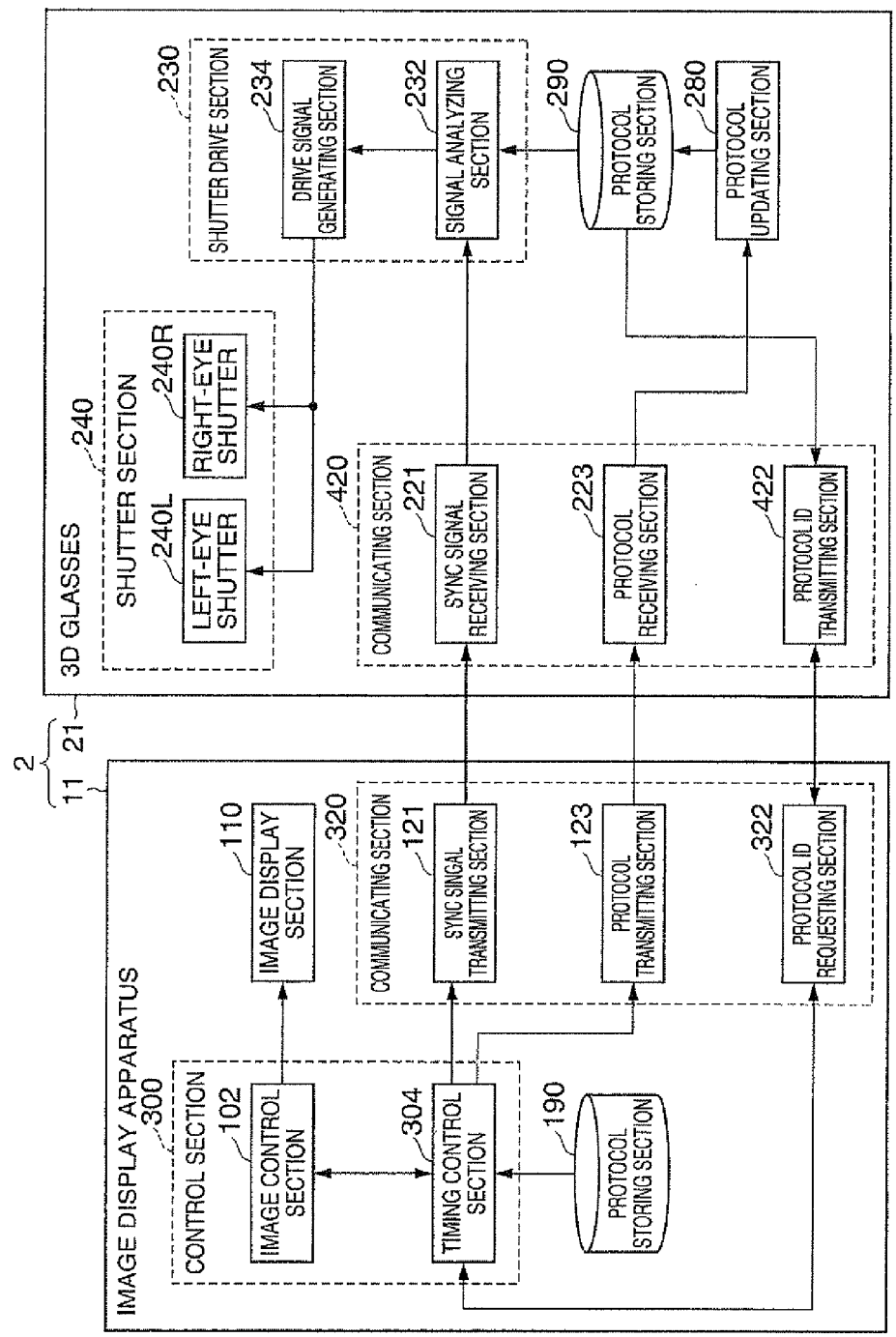
FIG. 3 is an example of a functional block diagram of an image display system according to a second embodiment of the invention.

Hereinafter, a second embodiment of the invention will be described in detail with reference to the accompanying drawings. FIG. 3 is an example of a functional block diagram of an image display system 2 according to the second embodiment of the invention.

Image Display Apparatus 11

The image display apparatus 11 includes a control section 300, an image display section 110, a communicating section 320 and a protocol storing section 190. The control section 300 includes an image control section 102 and a timing control section 304 (transmission necessity determining section). The communicating section 320 includes a sync signal sending section 121, a protocol sending section 123 and a protocol ID requesting section 322.

The image control section 102, the image display section 110, the sync signal sending section 121, the protocol sending section 123 and the protocol storing section 190 which are provided in the image display apparatus 11 according to the second embodiment have the same functions as those of the image control section 102, the image display section 110, the sync signal sending section 121, the protocol sending section 123 and the protocol storing section 190 which are provided in the image display apparatus 10 according to the first embodiment, and thus, their description will be omitted.

The timing control section 304 obtains a sync signal and sends the obtained sync signal to 3D glasses 21 through the sync signal sending section 121, in a similar way to the timing control section 104 in the first embodiment.

Further, the timing control section 304 determines whether transmission of the protocol information (protocol information which is stored in the protocol storing section 190) to the 3D glasses 21 is necessary, as a function which is different from the timing control section 104 in the first embodiment. Specifically, the timing control section 304 determines whether transmission of the protocol information to the 3D glasses 21 is necessary, with reference to the protocol information of the current 3D glasses 21 (that is, protocol information which is stored in the protocol storing section 290 of the 3D glasses 21).

For example, the timing control section 304 compares the protocol information of the current 3D glasses 21 with its protocol information (protocol information which is stored in the protocol storing section 190). In a case where both the protocols are the same, it is considered that the protocol of the image display apparatus 11 matches with the protocol of the 3D glasses 21, and thus, the timing control section 304 determines that transmission of the protocol information to the 3D glasses 21 is not necessary. On the other hand, in a case where both the protocols are different from each other, it is considered that the protocol of the image display apparatus 11 does not match with the protocol of the 3D glasses 21, and thus, the timing control section 304 determines that transmission of the protocol information to the 3D glasses 21 is necessary.

More specifically, before the protocol information is output to the protocol sending section 123, the timing control section 304 outputs, to a protocol ID requesting section 322, a command for requesting the 3D glasses 21 to send a protocol ID (identification information specific to each protocol, which is given for identifying each protocol), and obtains the protocol ID through the protocol ID requesting section 322. The timing control section 304 which obtains the protocol ID through the protocol ID requesting section 322 determines that transmission of the protocol information to the 3D glasses 21 is not necessary in a case where the protocol ID (protocol ID of the protocol of the current 3D glasses 21) which is obtained through the protocol ID requesting section 322 is the same as the protocol ID of the protocol stored in the protocol storing section 190, and determines that transmission of the protocol information to the 3D glasses 21 is necessary in a case where the protocol ID obtained through the protocol ID requesting section 322 is not the same as the protocol ID of the protocol stored in the protocol storing section 190.

In a case where it is determined that transmission of the protocol information to the 3D glasses 21 is necessary, the timing control section 304 outputs the protocol information to the protocol sending section 123, in a similar way to the timing control section 104 in the first embodiment.

The protocol ID requesting section 322 obtains a command for requesting the protocol ID to the 3D glasses 21 from the timing control section 304. In a case where this command is obtained, the protocol ID requesting section 322 requests the protocol ID to the 3D glasses 21 through wireless communication or wired communication. In a case where the protocol ID is obtained from the 3D glasses 21, the protocol ID requesting section 322 outputs the obtained protocol ID to the timing control section 304.

3D Glasses 21

The 3D glasses 21 include a communicating section 420, a shutter drive section 230, a shutter section 240, a protocol updating section 280 and a protocol storing section 290. The communicating section 420 includes a sync signal receiving section 221, a protocol receiving section 223 and a protocol ID sending section 422. The shutter drive section 230 includes a signal analyzing section 232 and a drive signal generating section 234. The shutter section 240 includes a left-eye shutter 240L and a right-eye shutter 240R.

Since the sync signal receiving section 221, the protocol receiving section 223, the shutter drive section 230, the shutter section 240, the protocol updating section 280 and the protocol storing section 290 which are provided in the 3D glasses 21 in the second embodiment have the same functions as those of the sync signal receiving section 221, the protocol receiving section 223, the shutter drive section 230, the shutter section 240, the protocol updating section 280 and the protocol storing section 290 which are provided in the 3D glasses 20 in the first embodiment, their description will be omitted.

The protocol ID sending section 422 receives a request for sending a protocol ID from the protocol ID requesting section 322 of the image display apparatus 11 through wireless communication or wired communication. In a case where the transmission request of the protocol ID is received, the protocol ID sending section 422 outputs (sends) the protocol ID of its protocol (protocol corresponding to the protocol information stored in the protocol storing section 290) to the image display apparatus 11. For example, the protocol ID sending section 422 reads the protocol ID with reference to the protocol storing section 290, and outputs the read protocol ID to the image display apparatus 11.

Figure 4:
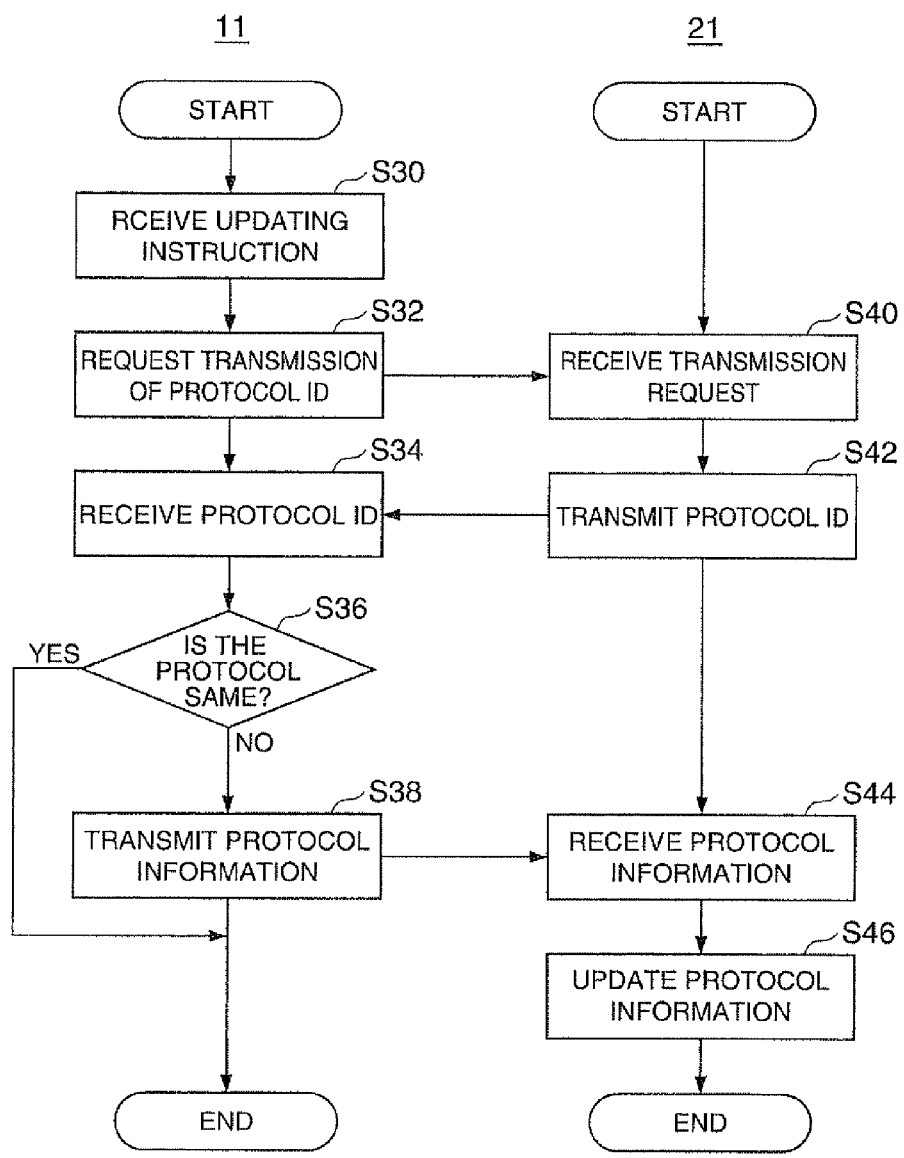
FIG. 4 is a flowchart illustrating an example of an operation of the image display system according to the second embodiment of the invention.

Hereinafter, an operation of the image display system 2 will be described with reference to FIG. 4. FIG. 4 is a flowchart illustrating an example of the operation of the image display system 2 according to the second embodiment of the invention. Specifically, the left side of the flowchart in FIG. 4 represents an operation of the image display apparatus 11 relating to updating of the protocol information, and the right side of the flowchart in FIG. 4 represents an operation of the 3D glasses 21 relating to updating of the protocol information.

The timing control section 304 of the image display apparatus 11 receives the updating instruction of the protocol information from the user through the operation receiving section (not shown) (step S30). The timing control section 304 which receives this instruction outputs a command for requesting the 3D glasses 21 to send the protocol ID to the protocol ID requesting section 322. In a case where the image control section 102 receives the updating instruction of the protocol information from the user through the operation receiving section (not shown) to output the protocol information to the timing control section 304 and the timing control section 304 obtains this protocol information, the timing control section 304 may output the command for requesting the 3D glasses 21 to send the protocol ID to the protocol ID requesting section 322.

The protocol ID requesting section 322 which obtains the command for requesting the protocol ID of the 3D glasses 21 requests the 3D glasses 21 to send the protocol ID (step S32).

The protocol ID sending section 422 of the 3D glasses 21 receives the transmission request of the protocol ID from the protocol ID requesting section 322 of the image display apparatus 11 (step S40). The protocol ID sending section 422 which receives this request sends the protocol ID of its protocol to the image display apparatus 11 (step S42).

The protocol ID requesting section 322 which requests the protocol ID of the 3D glasses 21 in step S32 receives the protocol ID from the protocol ID sending section 422 of the 3D glasses 21 (step S34). The protocol ID requesting section 322 which receives the protocol ID outputs the received protocol ID to the timing control section 304.

The timing control section 304 which obtains the protocol ID through the protocol ID requesting section 322 determines whether the protocol (of the image display apparatus 11) is the same as the protocol of the 3D glasses 21 (step S36). Specifically, the timing control section 304 determines whether the protocol ID obtained through the protocol ID requesting section 322 is the same as the protocol ID of the protocol stored in the protocol storing section 190.

In a case where it is determined in step 36 that the protocol (of the image display apparatus 11) is not the same as the protocol of the 3D glasses 21 (step S36, No), the timing control section 304 outputs the protocol information to the protocol sending section 123.

The protocol sending section 123 which obtains the protocol information sends the obtained protocol information to the 3D glasses 21 through wireless communication or wired communication (step S38). Then, the process of the image display apparatus 11 relating to updating of the protocol information ends.

On the other hand, in a case where it is determined in step 36 that the protocol (of the image display apparatus 11) is the same as the protocol of the 3D glasses 21 (step S36, Yes), the timing control section 304 does not perform step S38, and then, the process of the image display apparatus 11 relating to updating of the protocol information ends.

On the other hand, in a case where the protocol receiving section 223 of the 3D glasses 21 receives the protocol information from the protocol sending section 123 of the image display apparatus 11 (step S44), the protocol receiving section 223 outputs the received protocol information to the protocol updating section 280. The protocol updating section 280 which obtains the protocol information through the protocol receiving section 223 updates the protocol information stored in the protocol storing section 290 into the protocol information obtained through the protocol receiving section 223 (step S46). Then, the process of the 3D glasses 21 relating to updating of the protocol information ends.

In a case where the timing control section 304 determines that its protocol (of the image display apparatus 11) is the same as the protocol of the 3D glasses 21 (step S36, Yes), since the protocol information is not sent, step S44 and step S46 are not performed, and then, the process of the 3D glasses 21 relating to updating of the protocol information ends.

The image display system 2 according to the second embodiment of the invention has been described above. The image display system 2 has an effect of performing a changing process only with respect to the 3D glasses in which a protocol change is necessary, in addition to the effects of the image display system 1 according to the first embodiment.

Third Embodiment

Figure 5:
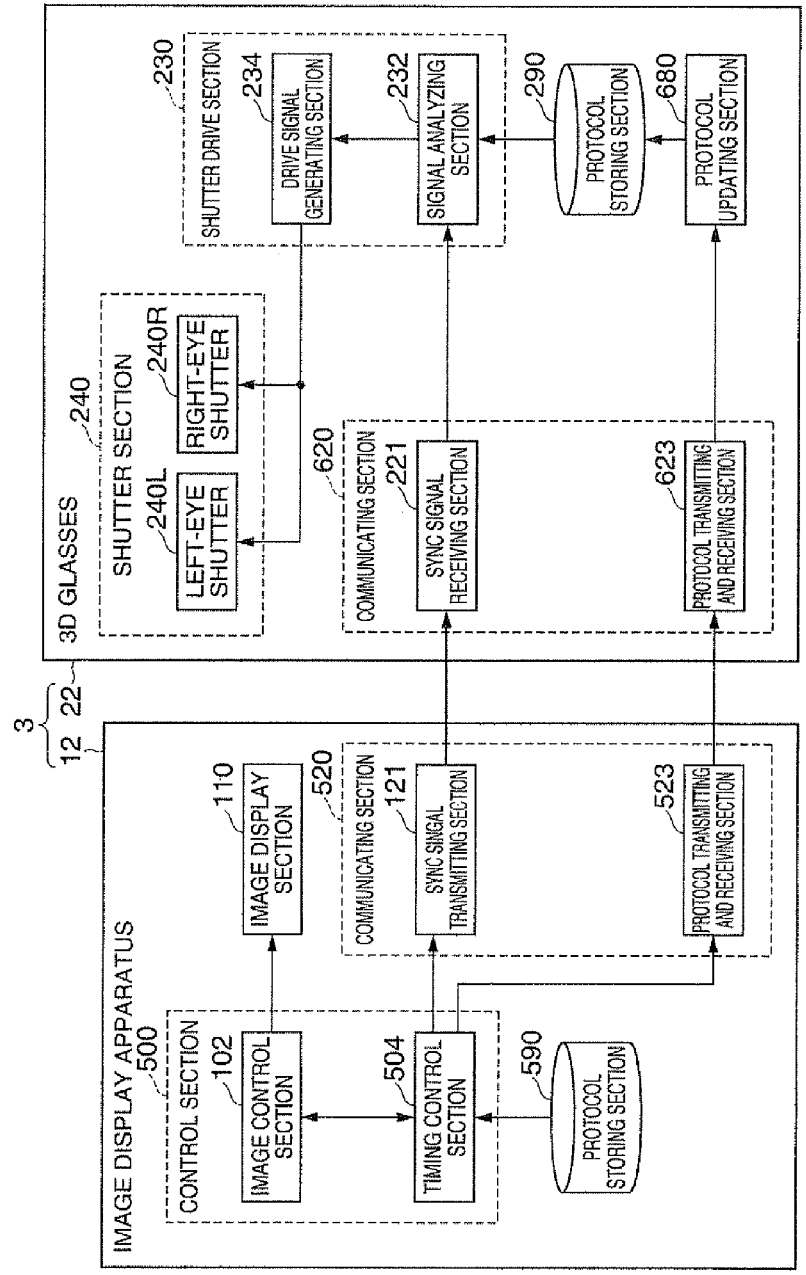
FIG. 5 is an example of a functional block diagram of an image display system according to a third embodiment of the invention.

Hereinafter, a third embodiment of the invention will be described with reference to the accompanying drawings. FIG. 5 is an example of a functional block diagram of an image display system 3 according to the third embodiment of the invention.

Image Display Apparatus 12

An image display apparatus 12 includes a control section 500, an image display section 110, a communicating section 520 and a protocol storing section 590 (protocol saving section). The control section 500 includes an image control section 102 and a timing control section 504. The communicating section 520 includes a sync signal sending section 121 and a protocol sending and receiving section 523.

Since the image control section 102, the image display section 110 and the sync signal sending section 121 which are provided in the image display apparatus 12 according to the third embodiment have the same functions as those of the image control section 102, the image display section 110, and the sync signal sending section 121 which are provided in the image display apparatus 10 according to the first embodiment, their description will be omitted.

The protocol storing section 590 includes a region where protocol information (referred to as "first protocol information" in the present embodiment) to be sent to the 3D glasses 22 is stored and a region where protocol information (referred to as "second protocol information" in the present embodiment) stored in the 3D glasses 22 is stored. Here, the term "first protocol information" is protocol information corresponding to the protocol (first protocol) of the image display apparatus 12, and the term "second protocol information" is protocol information corresponding to the protocol (second protocol) of the 3D glasses 22. At the time of production (shipping) of the image display apparatus 12, the first protocol information is stored in the protocol storing section 590, but the second protocol information is not stored therein. NOM The timing control section 504 obtains a sync signal and outputs the obtained sync signal to the 3D glasses 22 through the sync signal sending section 121, in a similar way to the timing control section 104 in the first embodiment.

Further, the timing control section 504 outputs the first protocol information stored in the protocol storing section 590 to the protocol sending and receiving section 523, in a similar way to the timing control section 104 in the first embodiment.

Further, the timing control section 504 obtains the second protocol information stored in the 3D glasses 22 (protocol storing section 290) through the protocol sending and receiving section 523, as a function which is different from the timing control section 104 in the first embodiment. specifically, before the first protocol information is output to the protocol sending and receiving section 523, the timing control section 504 outputs a command for requesting the 3D glasses 22 to send the second protocol information to the protocol sending and receiving section 523, and obtains the second protocol information stored in the 3D glasses 22 through the protocol sending and receiving section 523.

In a case where the second protocol information stored in the 3D glasses 22 is obtained, the timing control section 504 stores (saves) the obtained protocol information in the protocol storing section 590. Thus, the first protocol information and the second protocol information are stored in the protocol storing section 590.

The protocol sending and receiving section 523 obtains the command for requesting the 3D glasses 22 to send the second protocol information from the timing control section 504. In a case where this command is obtained, the protocol sending and receiving section 523 requests the 3D glasses 22 to send the second protocol information through wireless communication or wired communication. In a case where the second protocol information is obtained from the 3D glasses 22, the protocol sending and receiving section 523 outputs the obtained second protocol information to the timing control section 504.

Further, the protocol sending and receiving section 523 sends the first protocol information stored in the protocol storing section 590 to the 3D glasses 22, in a similar way to the protocol sending section 123 in the first embodiment.

3D Glasses 22

The 3D glasses 22 include a communicating section 620, a shutter drive section 230, a shutter section 240, a protocol updating section 680 and a protocol storing section 290. The communicating section 620 includes a sync signal receiving section 221 and a protocol sending and receiving section 623. The shutter drive section 230 includes a signal analyzing section 232 and a drive signal generating section 234. The shutter section 240 includes a left-eye shutter 240L and a right-eye shutter 240R.

Since the sync signal receiving section 221, the shutter drive section 230, the shutter section 240 and the protocol storing section 290 which are provided in the 3D glasses 22 in the third embodiment have the same functions as those of the sync signal receiving section 221, the shutter drive section 230, the shutter section 240, and the protocol storing section 290 which are provided in the 3D glasses 20 in the first embodiment, their description will be omitted.

The protocol sending and receiving section 623 receives a request for sending the second information from the image display apparatus 12 (protocol sending and receiving section 523) through wireless communication or wired communication. In a case where the transmission request of the second protocol information is received, the protocol sending and receiving section 623 outputs a protocol reading command to the protocol updating section 680 and outputs (sends) the second protocol information stored in the protocol storing section 290 to the image display apparatus 12 through the protocol updating section 680. The second protocol information output to the image display apparatus 12 is stored in the image display apparatus 12 (protocol storing section 590).

Further, the protocol sending and receiving section 623 receives the first protocol information from the image display apparatus 12 (protocol sending and receiving section 523), in a similar way to the protocol sending section 223 in the first embodiment. The protocol sending and receiving section 623 outputs the first protocol information received from the image display apparatus 12 to the protocol updating section 680.

The protocol updating section 680 obtains the protocol reading command from the protocol sending and receiving section 623. In a case where the protocol reading command is obtained, the protocol updating section 680 reads the second protocol information stored in the protocol storing section 290 and outputs the result to the protocol sending and receiving section 623.

Further, the protocol updating section 680 obtains the first protocol information from the protocol sending and receiving section 623, in a similar way to the protocol updating section 280 in the first embodiment. In a case where the first protocol information is obtained through the protocol sending and receiving section 623, the protocol updating section 680 updates the second protocol information stored in the protocol storing section 290 into the first protocol information obtained through the protocol sending and receiving section 623.

Figure 6:
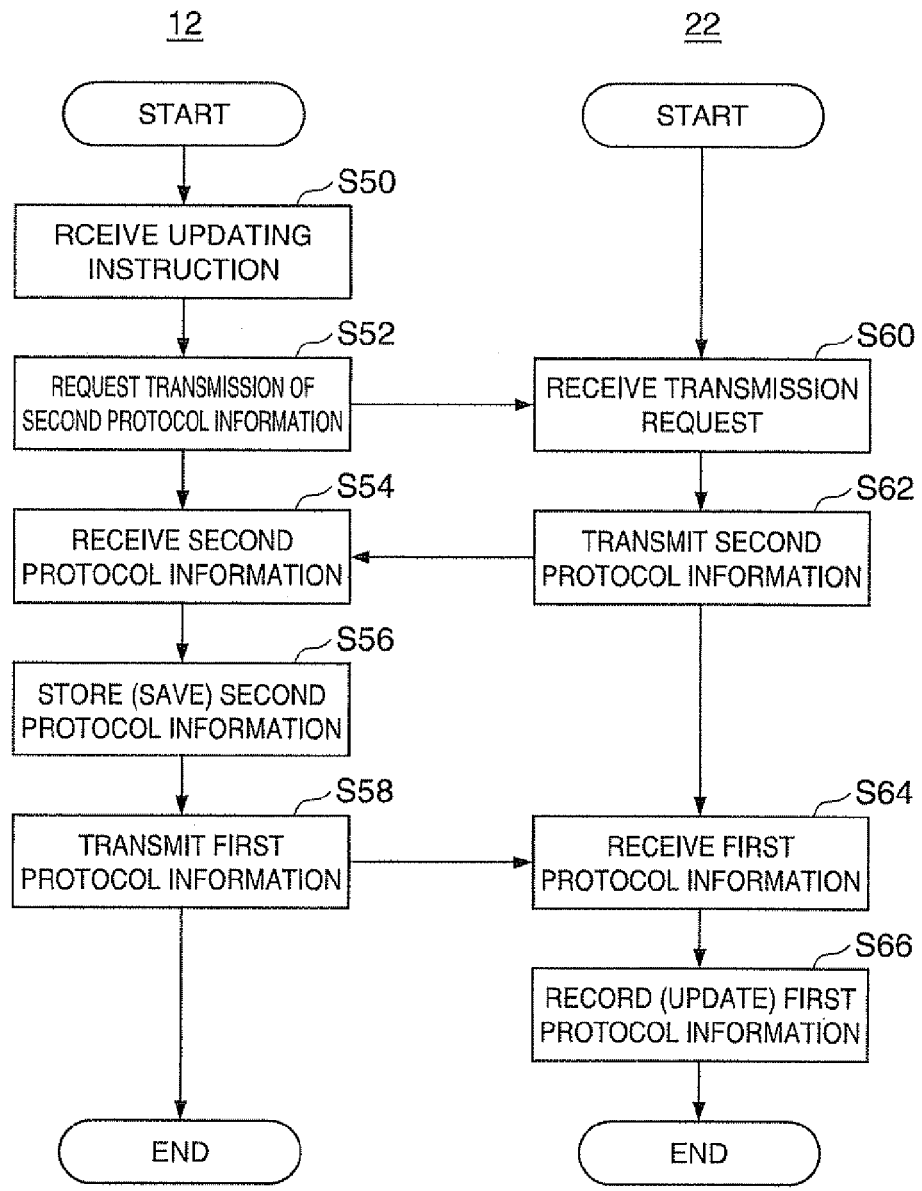
FIG. 6 is a flowchart illustrating an example of an operation of the image display system according to the third embodiment of the invention.

Hereinafter, an operation of the image display system 3 will be described with reference to FIG. 6. FIG. 6 is a flowchart illustrating an example of the operation of the image display system 3 according to the third embodiment of the invention. Specifically, the left side of the flowchart in FIG. 6 represents an operation of the image display apparatus 12 relating to updating of the protocol information, and the right side of the flowchart in FIG. 6 represents an operation of the 3D glasses 22 relating to updating of the protocol information.

The timing control section 504 of the image display apparatus 12 receives the updating instruction of the protocol information from the user through the operating receiving section (not shown) (step S50). The timing control section 504 which receives the updating instruction of the protocol information outputs a command for requesting the 3D glasses 22 to send the second protocol information to the protocol sending and receiving section 523. Here, in a case where the image control section 102 receives the updating instruction of the protocol information from the user through the operation receiving section (not shown) to output the protocol information to the timing control section 504 and the timing control section 504 obtains this protocol information, the timing control section 504 may output the command for requesting the 3D glasses 22 to send the second protocol information to the protocol sending and receiving section 523.

The protocol sending and receiving section 523 which obtains the command for requesting the 3D glasses 22 to send the second protocol information requests the 3D glasses 22 to send the second protocol information (step S52).

The protocol sending and receiving section 623 of the 3D glasses 22 receives the transmission request of the second protocol information from the protocol sending and receiving section 523 of the image display apparatus (step S60). The protocol sending and receiving section 623 which receives the transmission request of the second protocol information outputs a protocol reading command to the protocol updating section 680, and outputs (sends) the second protocol information stored in the protocol storing section 290 to the image display apparatus 12 through the protocol updating section 680 (step S62).

The protocol sending and receiving section 523 of the image display apparatus 12 receives the second protocol information stored in the protocol storing section 290 of the 3D glasses 22 through the protocol sending and receiving section 623 of the 3D glasses 22 (step S54). The protocol sending and receiving section 523 which receives the second protocol information from the 3D glasses 22 outputs the second protocol information to the timing control section 504. The timing control section 504 which obtains the second protocol information through the protocol sending and receiving section 523 stores this information in the protocol storing section 590 (step S56).

Then, the timing control section 504 outputs the first protocol information to the protocol sending and receiving section 523. The protocol sending and receiving section 523 which obtains the first protocol information sends the obtained protocol information to the 3D glasses 22 through wireless communication or wired communication (step S58). Then, the process of the image display apparatus 12 relating to updating of the protocol information ends.

On the other hand, the protocol sending and receiving section 623 of the 3D glasses 22 receives the first protocol information through the protocol sending and receiving section 523 of the image display apparatus (step S64). The protocol sending and receiving section 623 which receives the first protocol information outputs the received protocol information to the protocol updating section 680.

The protocol updating section 680 which obtains the first protocol information through the protocol sending and receiving section 623 updates the second protocol information stored in the protocol storing section 290 into the first protocol information obtained through the protocol sending and receiving section 623 (step S66). Then, the process of the 3D glasses 22 relating to updating of the protocol information ends.

The image display system 3 according to the third embodiment of the invention as described above can save the protocol information which is originally stored in the 3D glasses. Accordingly, the image display system 3 has an effect of returning the protocol information of the 3D glasses to the original state as necessary, in addition to the effects of the image display system 1 according to the first embodiment.

Fourth Embodiment

Figure 7:
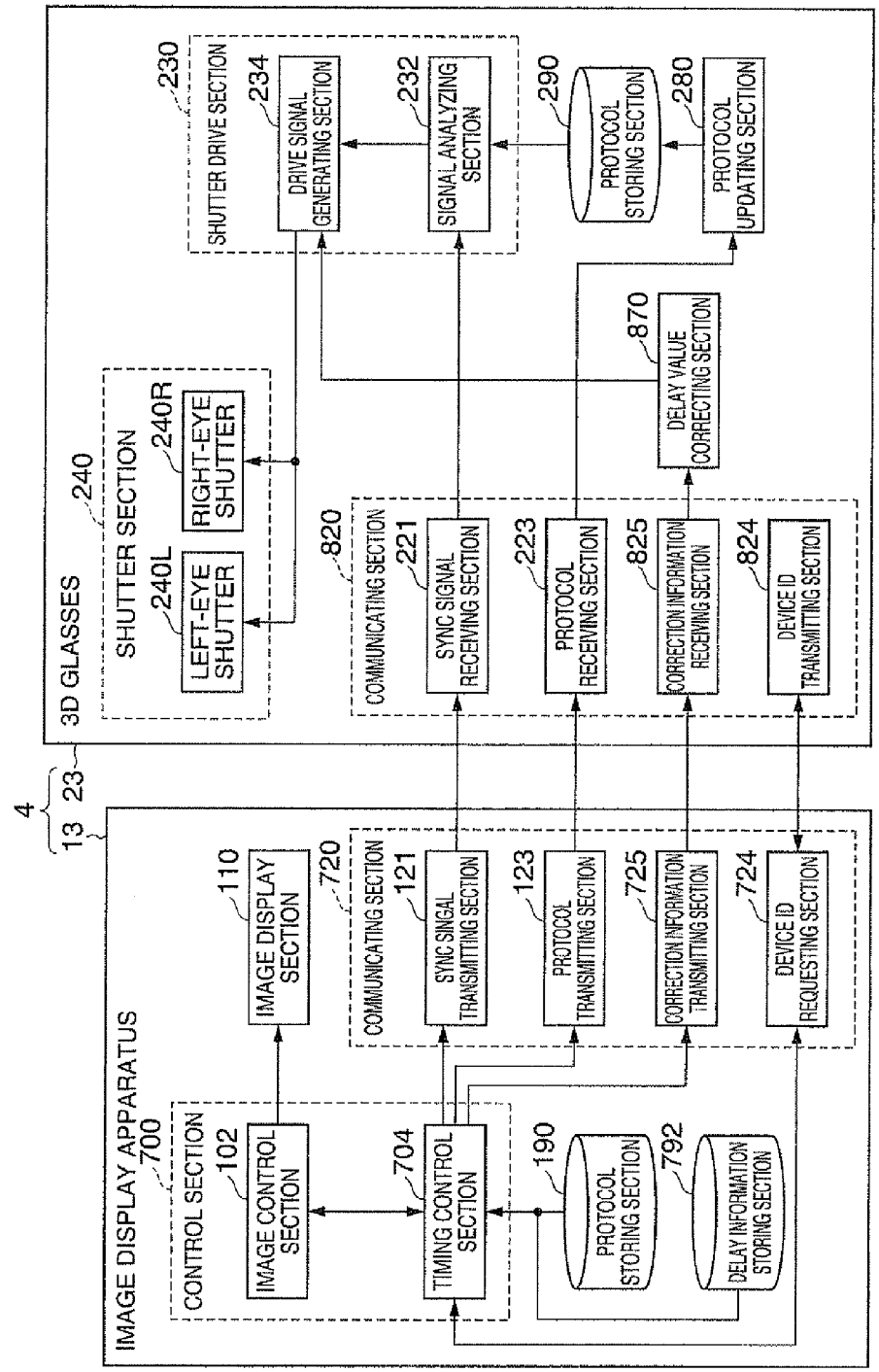
FIG. 7 is an example of a functional block diagram of an image display system according to a fourth embodiment of the invention.

Hereinafter, a fourth embodiment of the invention will be described in detail with reference to the accompanying drawings. FIG. 7 is an example of a functional block diagram of an image display system 4 according to the fourth embodiment of the invention.

Image Display Apparatus 13

The image display apparatus 13 includes a control section 700, an image display section 110, a communicating section 720, a protocol storing section 190, and a delay information storing section 792. The control section 700 includes an image control section 102 and a timing control section 704

(correction necessity determining section). The communicating section 720 includes a sync signal sending section 121, a protocol sending section 123, a device ID requesting section 724, and a correction information sending section 725.

Since the image control section 102, the image display section 110, the sync signal sending section 121, the protocol sending section 123, and the protocol storing section 190 which are provided in the image display apparatus 13 according to the fourth embodiment have the same functions as those of the image control section 102, the image display section 110, the sync signal sending section 121, the protocol sending section 123, and the protocol storing section 190 which are provided in the image display apparatus 10 according to the first embodiment, their description will be omitted.

The timing control section 704 obtains a sync signal and outputs the obtained sync signal to 3D glasses 23 through the sync signal sending section 121, in a similar way to the timing control section 104 in the first embodiment.

Further, the timing control section 704 outputs the protocol information stored in the protocol storing section 190 to the protocol sending section 123, in a similar way to the timing control section 104 in the first embodiment.

The delay information storing section 792 stores delay information relating to a delay value according to the type of the 3D glasses. For example, the delay information storing section 792 stores a delay value (a delay value at the shipping time) for each device ID indicating the type (type number) of the 3D glasses. The term "delay value" is the time from the time when the sync signal in the 3D glasses is received to the time when the shutter section is driven, which is generally set to an appropriate delay value at the shipping time. Accordingly, a case where it is necessary to correct the delay value refers to, for example, a case where the current delay value of the 3D glasses is out of an allowable range when the standard which regulates the allowable range of the delay value and the like is established in the future. The allowable range of the delay value as described above is stored in the delay information storing section 792.

Further, the timing control section 704 determines whether correction of the delay value of the 3D glasses is necessary, as a function which is different from the timing control section 104 in the first embodiment. For example, the timing control section 704 obtains a device ID which identifies the type of the 3D glasses 23 from the device ID requesting section 724, and determines whether the correction of the delay value is necessary, according to whether the delay value corresponding to the device ID obtained from the device ID requesting section 724 is within the allowable range in the delay information storing section 792, with reference to the delay information storing section 792. That is, in a case where the delay value is within the allowable range, the timing control section 704 determines that the correction of the delay value is not necessary, and in a case where the delay value is out of the allowable range, the timing control section 704 determines that the correction of the delay value is necessary. In a case where it is determined that the correction of the delay value in the 3D glasses 23 is necessary, the timing control section 704 determines the amount of correction of the delay value. For example, the timing control section 704 determines a value which makes the delay value of the timing control section 704 within the above-described allowable range as the amount of correction of the delay value.

When receiving an instruction for correction of the delay value from the user through an operation receiving section (not shown), the timing control section 704 may output an instruction for requesting the 3D glasses 23 to send the device ID to the device ID requesting section 724, and then may obtain the device ID through the device ID requesting section 724. In a case where the image control section 102 receives the instruction and the timing control section 704 obtains a notification indicating that the instruction is received from the image control section 102, the timing control section 704 may output a command for requesting the 3D glasses 23 to send the device ID to the device ID requesting section 724.

The timing control section 704 which determines the amount of correction of the delay value outputs correction information indicating the amount of correction of the delay value to the correction information sending section 725. The correction information sending section 725 which obtains the correction information from the timing control section 704 sends the obtained correction information to the 3D glasses 23 through wireless communication or wired communication.

The device ID requesting section 724 requests the 3D glasses 23 to send the device ID through wireless communication or wired communication. In a case where the device ID is obtained from the 3D glasses 23, the device ID requesting section 724 outputs the obtained device ID to the timing control section 704. In a case where the command for requesting the 3D glasses 23 to send the device ID is obtained from the timing control section 704, the device ID requesting section 724 may request the 3D glasses 23 to send the device ID.

3D Glasses 23

The 3D glasses 23 include a communicating section 820, a shutter drive section 230, a shutter section 240, a protocol updating section 280, a protocol storing section 290 and a delay value correcting section 870. The communicating section 820 includes a sync signal receiving section 221, a protocol receiving section 223, a device ID sending section 824 and a correction information receiving section 825. The shutter drive section 230 includes a signal analyzing section 232 and a drive signal generating section 234. The shutter section 240 includes a left-eye shutter 240L and a right-eye shutter 240R.

Since the sync signal receiving section 221, the protocol receiving section 223, the shutter drive section 230, the shutter section 240, the protocol updating section 280 and the protocol storing section 290 which are provided in the 3D glasses 23 in the fourth embodiment have the same functions as those of the sync signal receiving section 221, the protocol receiving section 223, the shutter drive section 230, the shutter section 240, the protocol updating section 280 and the protocol storing section 290 which are provided in the 3D glasses 20 in the first embodiment, their description will be omitted.

The device ID sending section 824 receives a request for sending a device ID from the image display apparatus (device ID requesting section 724) through wireless communication or wired communication. In a case where the transmission request of the device ID is received, the device ID sending section 824 outputs (sends) its device ID to the image display apparatus 13. For example, the device ID sending section 824 reads the retained device ID with reference to a device ID retaining section (not shown), and outputs the read device ID to the image display apparatus 13.

The correction information receiving section 825 receives the correction information from the image display apparatus 13 (correction information sending section 725) through wireless communication or wired communication. The correction information receiving section 825 outputs the correction information received from the image display apparatus 13 to the delay value correcting section 870.

The delay value correcting section 870 receives the correction information through the correction information receiving section 825. In a case where the correction information is obtained through the correction information receiving section 825, the delay value correcting section 870 corrects parameters relating to the delay value retained in the shutter drive section 230 (drive signal generating section 234) on the basis of the obtained correction information.

Figure 8:
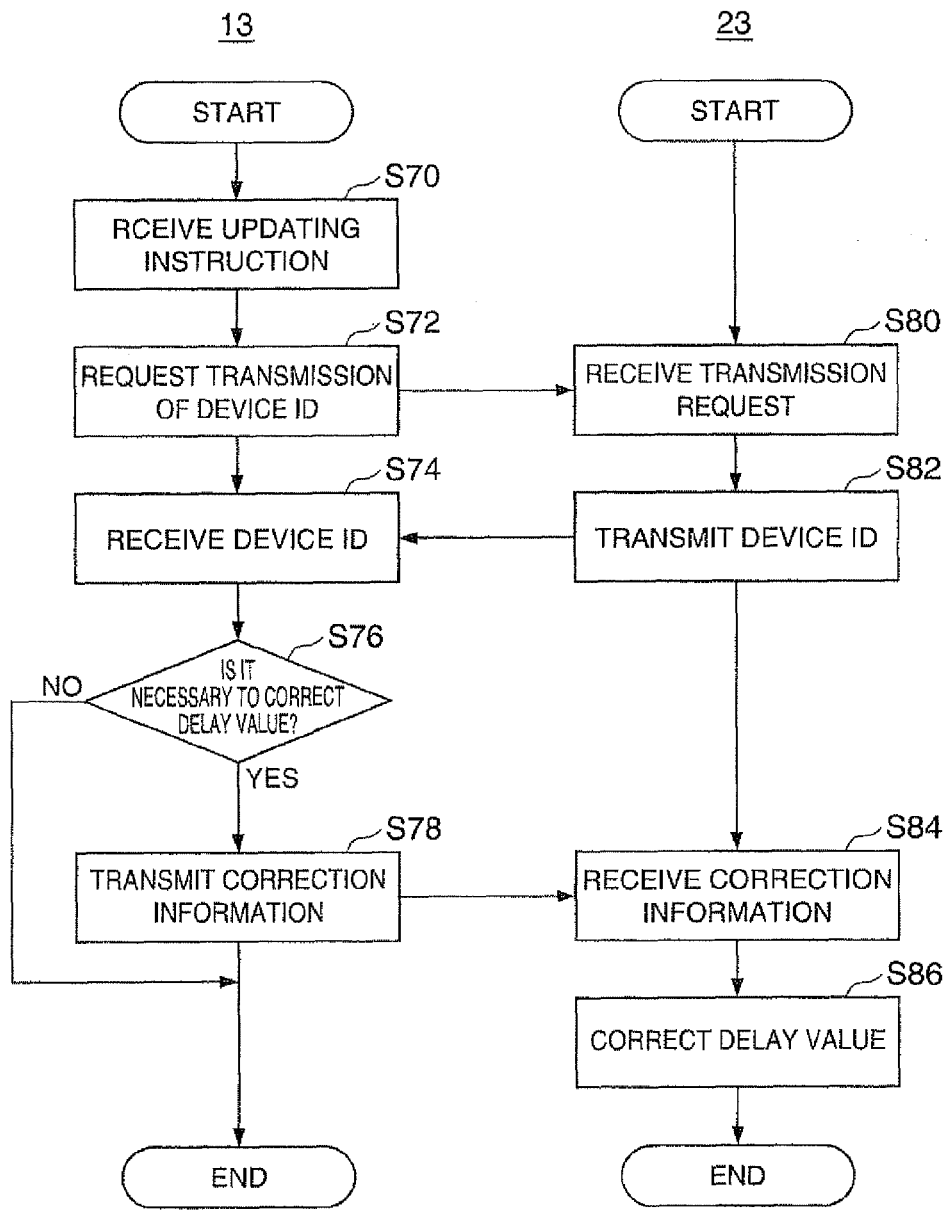
FIG. 8 is a flowchart illustrating an example of an operation of the image display system according to the fourth embodiment of the invention.

Hereinafter, an operation of the image display system 4 will be described with reference to FIG. 8. FIG. 8 is a flowchart illustrating an example of the operation of the image display system 4 according to the fourth embodiment of the invention. Specifically, the left side of the flowchart in FIG. 8 represents an operation of the image display apparatus 13 relating to correction of the delay value, and the right side of the flowchart in FIG. 8 represents an operation of the 3D glasses 23 relating to correction of the delay value.

The timing control section 704 of the image display apparatus 13 receives the correction instruction of the delay value from the user through the operation receiving section (not shown) (step S70). The timing control section 704 which receives the correction instruction of the delay value outputs a command for requesting the 3D glasses 23 to send the device ID to the device ID requesting section 724. In a case where the image control section 102 receives this instruction and the timing control section 704 obtains a notification indicating that the instruction is received from the image control section 102, the timing control section 704 may output the command for requesting the 3D glasses 23 to send the device ID to the device ID requesting section 724.

The device ID requesting section 724 which obtains the command for requesting the 3D glasses 23 to send the device ID requests the 3D glasses 23 to send the device ID (step S72).

The device ID sending section 824 of the 3D glasses receives the transmission request of the device ID from the device ID requesting section 724 of the image display apparatus 13 (step S80). The device ID sending section 824 which receives the transmission request of the device ID send its device ID to the image display apparatus 13 (step 882).

The device ID requesting section 724 which requests the 3D glasses 23 to send the device ID in step 872 receives the device ID from the device ID sending section 824 of the 3D glasses 23 (step 874). The device ID requesting section 724 which receives the device ID outputs the received device ID to the timing control section 704.

The timing control section 704 which obtains the device ID through the device ID requesting section 724 determines whether it is necessary to correct the delay value of the 3D glasses 23 (step S76). Specifically, the timing control section 704 determines whether the correction of the delay value is necessary according to whether the delay value corresponding to the device ID obtained through the device ID requesting section 724 is within the allowable range in the delay information storing section 792.

In a case where it is determined in step S76 that it is necessary to correct the delay value of the 3D glasses (step S76, Yes), the timing control section 704 determines the amount of correction of the delay value. For example, the timing control section 704 determines a value which makes the delay value of the timing control section 704 within the allowable range as the amount of correction of the delay value. The timing control section 704 outputs correction information indicating the determined correction amount to the correction information sending section 725. The correction information sending section 725 which obtains the correction information from the timing control section 704 sends the obtained correction information to the 3D glasses 23 through wireless communication or wired communication (step S78). Then, the process of the image display apparatus 13 relating to correction of the delay value ends.

On the other hand, in a case where the correction information is received through the correction information sending section 725 of the image display apparatus 13 (step S84), the correction information receiving section 825 of the 3D glasses 23 outputs the received correction information to the delay value correcting section 870. The delay value correcting section 870 which obtains the correction information through the correction information receiving section 825 corrects parameters relating to the delay value retained in the shutter drive section 230 (drive signal generating section 234) on the basis of the obtained correction information (step S86). Then, the process of the 3D glasses 23 relating to correction of the delay value ends.

In a case where the timing control section 704 determines that it is not necessary to correct the delay value of the 3D glasses 23 (step S76, No), since the correction information is not sent, step S84 and step S86 are not performed, and then, the process of the 3D glasses 23 relating to correction of the delay value ends.

The image display system 4 according to the fourth embodiment of the invention has been described above. The image display system 4 has an effect of correcting the delay value of the 3D glasses as necessary, in addition to the effects of the image display system 1 according to the first embodiment.

As described above, according to the image display systems 1 to 4 according to the first to fourth embodiments of the invention, even though 3D glasses having a different protocol are not newly purchased, it is possible to simply change the protocol in the existing 3D glasses into the different protocol. That is, it is possible to reduce the cost burden to the user, with little work burden. Further, in a case where protocols are united in the future, it is possible to change the protocol into the united protocol through the image display apparatus, and it is thus possible to suppress the burden without purchasing 3D glasses suitable for the united protocol.

By recording programs for execution of the processes of the image display apparatuses 10, 11, 12 or 13 according to the respective embodiments of the invention, or 3D glasses control apparatus 30 on a computer-readable recording medium and by reading the programs recorded on the recording medium in a computer system for execution, the image display apparatuses 10, 11, 12 or 13, or the 3D glasses control apparatus 30 may be realized. Here, the term "computer system" may include hardware such as an OS or peripherals. Further, in a case where the term "computer system" uses the World Wide Web, the computer system may also include a homepage support environment (or display environment). Further, the term "computer-readable recording medium" refers to a writable non-volatile memory such as a flexible disc, a magneto-optical disc, a ROM or a flash memory; a portable medium such as a CD-ROM; or a storage device such as a hard disk which is built-in a computer system.

Further, the term "computer-readable recording medium" may also include a medium which temporarily retains a program, such as a volatile memory (for example, DRAM (Dynamic Random Access Memory)) in a computer system which serves as a server or a client in a case where the program is transmitted through a network such as the Internet or a communication line such as a telephone line. Further, the program may be transmitted to a different computer system from a computer system which stores this program in a storage device or the like, through a transmission medium or through transmission waves in the transmission medium. Here, the "transmission medium" which transmits the program refers to a medium which has a function of transmitting information, such as a network (communication network) such as the Internet or a communication line such as a telephone line. Further, the program may be provided for realizing a part of the above-described functions. Further, the program may be a so-called differential file (differential program) which can realize the above-described functions in combination with a program which is already stored in the computer system.

The embodiments of the invention have been described with reference to FIGS. 1 to 8, but specific configurations are not limited to these embodiments, and may include a design or the like in a range without departing from the spirit of the invention. For example, the respective configurations in FIGS. 3, 5 and 7 may be appropriately combined.

Further, for example, in each of the image display apparatuses in FIGS. 1, 3, 5 and 7, the parts excluding the image control section 102, the image display section 110 and the protocol storing section 190 (590) (and the delay information storing section 792) may be separated from the image display apparatus, and may be used as the 3D glasses control apparatus. An external emitter which generates a sync signal is an example of the 3D glasses control apparatus.

In a case where the 3D glasses control apparatus is separated from the image display apparatus, a system which includes the 3D glasses control apparatus and the 3D glasses may be referred to as an image viewing system, and a system which includes the image display apparatus and the image viewing system may be referred to as an image display system.

Figure 9:
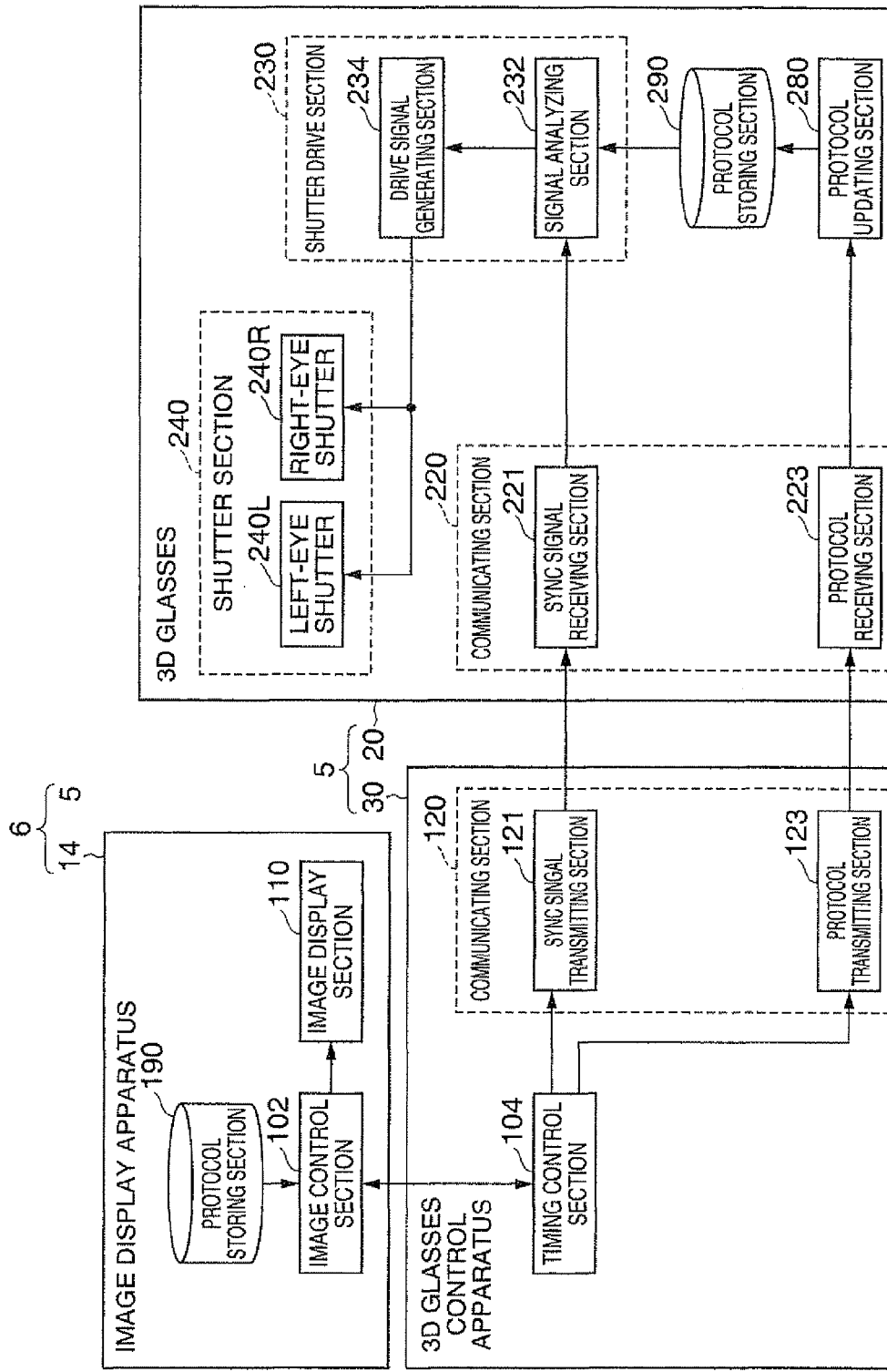
FIG. 9 is an example of a functional block diagram of an image display system according to another embodiment of the invention.

FIG. 9 is an example in which the 3D glasses control apparatus 30 is separated from the image display apparatus 10 of the image display system 1 according to the first embodiment of the invention. In FIG. 9, an image display system 6 includes an image viewing system 5 and an image display apparatus 14, and the image viewing system 5 includes the 3D glasses control apparatus 30 and the 3D glasses 20.

In the example shown in FIG. 9, the image display apparatus 14 includes a protocol storing section 190, but the 3D glasses control apparatus 14 may include the protocol storing section 190. Further, as shown in FIG. 9, the 3D glasses control apparatus may be separated from the image display apparatuses 11, 12 and 13 according to the other embodiments.

What is claimed is:

1. An image display system comprising:
    an image display apparatus configured to display a 3D image including a left-eye image and a right-eye image, the image display apparatus including:
        an image display section configured to display the 3D image,
        a sync signal sending section configured to transmit a sync signal for synchronizing display timings of the left-eye image and the right-eye image of the 3D image displayed on the image display section with the shutter device to the shutter device,
        a protocol sending section configured to transmit protocol information, which is information about a protocol used for analysis of the sync signal, to the shutter device,
        a device ID requesting section configured to request the shutter device to transmit a device ID for identifying the shutter device,
        a correction necessity determining section configured to: (i) determine whether correction of a delay value from the time when the sync signal is received to the time when the shutter section is driven, in the shutter device, is necessary based on the device ID received from the shutter device according to the transmission request of the device ID requesting section, and (ii) determine a correction amount of the delay value, and
        a correction information sending section configured to transmit correction information indicating the correction amount determined by the correction necessity determining section to the shutter device; and
    a shutter device configured to view the 3D image and including:
        a shutter section configured to transmit the left-eye image and the right-eye image of the 3D image,
        a protocol storing section configured to store the protocol information,
        a sync signal receiving section configured to receive the sync signal,
        a shutter drive section configured to analyze the sync signal received through the sync signal receiving section using the protocol information stored in the protocol storing section and drives the shutter section on the basis of the analysis result,
        a protocol receiving section configured to receive the protocol information, and
        a protocol updating section configured to update the protocol information stored in the protocol storing section into new protocol information received through the protocol receiving section.

2. The image display system according to claim 1, further comprising:
    a protocol ID requesting section which requests the shutter device to send a protocol ID for identifying the protocol stored in the protocol storing section of the shutter device as the protocol information; and
    a transmission necessity determining section which determines whether transmission of the protocol information is necessary on the basis of the protocol ID received from the shutter device according to the transmission request of the protocol ID requesting section.

3. The image display system according to claim 1, wherein:
    the image display apparatus further includes a protocol saving section which stores the protocol information to save the protocol information,
    the protocol sending section receives the protocol information stored in the shutter device, and
    the protocol saving section stores the protocol information received from the shutter device through the protocol sending section.

4. The image display system according to claim 1,
    wherein the shutter device further includes:
        a correction information receiving section which receives the correction information; and
        a delay value correcting section which corrects the delay value on the basis of the correction information received through the correction information receiving section.

5. An image display apparatus comprising:
    an image display section configured to display a 3D image including a left-eye image and a right-eye image;
    a sync signal sending section configured to transmit a sync signal to a shutter device which transmit the left-eye image and the right-eye image;
    a protocol sending section configured to transmit protocol information, which is information about a protocol used when the shutter device analyze the sync signal, to the shutter device;

a device ID requesting section configured to request the shutter device to transmit a device ID for identifying the shutter device;

a correction necessity determining section configured to: (i) determine whether correction of a delay value from the time when the sync signal is received to the time when the shutter section is driven, in the shutter device, is necessary based on the device ID received from the shutter device according to the transmission request of the device ID requesting section, and (ii) determine a correction amount of the delay value; and a correction information sending section configured to transmit correction information indicating the correction amount determined by the correction necessity determining section to the shutter device.

6. A shutter device for viewing a 3D image including a left-eye image and a right-eye image, the shutter device comprising:

a shutter section configured to transmit the left-eye image and the right-eye image of the 3D image;

a sync signal receiving section configured to receive a sync signal for synchronizing display timings of the left-eye image and the right-eye image of the 3D image with driving of the shutter section;

a protocol storing section configured to store protocol information which is information about a protocol used for analysis of the sync signal;

a shutter drive section configured to analyze the sync signal received through the sync signal receiving section using the protocol information stored in the protocol storing section and drives the shutter section on the basis of the analysis result;

a protocol receiving section configured to receive the protocol information;

a protocol updating section configured to update the protocol information stored in the protocol storing section into new protocol information received through the protocol receiving section;

a device ID requesting section configured to request the shutter device to transmit a device ID for identifying the shutter device;

a correction necessity determining section configured to: (i) determine whether correction of a delay value from the time when the sync signal is received to the time when the shutter section is driven, in the shutter device, is necessary based on the device ID received from the shutter device according to the transmission request of the device ID requesting section, and (ii) determine a correction amount of the delay value; and a correction information sending section configured to transmit correction information indicating the correction amount determined by the correction necessity determining section to the shutter device.

\* \* \* \* \*